United States Patent [19]
Watanabe

[11] Patent Number: 5,938,533
[45] Date of Patent: Aug. 17, 1999

[54] DRIVE PLATE FOR VEHICLES

[75] Inventor: Hiroshi Watanabe, Kosai, Japan

[73] Assignee: Fujikiko Kabushiki Kaisha, Tokyo, Japan

[21] Appl. No.: 08/827,387

[22] Filed: Mar. 27, 1997

[30] Foreign Application Priority Data

Mar. 29, 1996 [JP] Japan .................................. 8-077216

[51] Int. Cl.$^6$ .................................................. F16D 3/56
[52] U.S. Cl. ........................................... 464/98; 403/383
[58] Field of Search ................. 464/57, 92, 98, 464/88, 106, 152, 147, 150

[56] References Cited

U.S. PATENT DOCUMENTS

| | | |
|---|---|---|
| 2,380,776 | 7/1945 | Miller . |
| 2,407,757 | 9/1946 | MacCallum ............................. 464/98 |
| 3,400,956 | 9/1968 | Buchwald .............................. 403/383 |
| 3,427,826 | 2/1969 | Anderson ................................ 464/99 |
| 4,737,136 | 4/1988 | Federn ................................... 464/99 |
| 4,760,752 | 8/1988 | Wield et al. ........................... 403/383 |
| 5,704,839 | 1/1998 | Michael et al. ......................... 464/89 |

FOREIGN PATENT DOCUMENTS

| | | | |
|---|---|---|---|
| 1021778 | 2/1953 | France .................................... 464/99 |
| 2453688 | 5/1976 | Germany ................................ 464/99 |
| 32 22 119 C1 | 10/1983 | Germany . |
| 5420 | 12/1985 | WIPO .................................... 464/99 |

OTHER PUBLICATIONS

Patent Abstract of Japan, vol. 017, No. 330 (M–1434), Jun. 23, 1993 & JP 05 039837 A (Fuji Kiko Co Ltd.) Feb. 19, 1993.

Patent Abstract of Japan, vol. 010, No. 114 (M–473), Apr. 26, 1986 & JP 60 241568 A (Nissan Jidosha KK), Nov. 30, 1985.

*Primary Examiner*—Eileen Dunn Lillis
*Attorney, Agent, or Firm*—Thomas, Kayden, Horstemeyer & Risley

[57] ABSTRACT

A disk-like body has first holes arranged in a central portion in a circumferentially spaced manner for a fixing to a crankshaft, second holes arranged in a radially outer portion in a circumferentially spaced manner for a fixing to a torque converter, rigidity-controlling first openings arranged in vicinities of the second holes, and rigidity-controlling second openings all arranged simply between circumferentially neighboring ones of the first openings.

18 Claims, 10 Drawing Sheets

DRIVE PLATE FOR VEHICLES

BACKGROUND OF THE INVENTION

1. Field of the Invention

The present invention generally relates to a drive plate for vehicles, and particularly, it relates to a drive plate for vehicles of the type that includes an engine with a crankshaft and an automatic variable speed gear with a torque converter, in which the drive plate interconnects the crankshaft and the torque converter to each other.

2. Description of Relevant Art

Recent vehicles are mostly constituted such that a crankshaft has its tendency to turn (hereafter "turning effect" or "torque") transmitted to a wheel axle via a torque converter, as the torque is once transmitted to the torque converter from a drive plate fastened with the crankshaft.

FIGS. 1 and 2 show a conventional drive plate 1 for vehicles. The drive plate 1 comprises a body 2 formed from a metallic disk by a plastic working, and a ring gear 3 integrally joined to be fixed by a welding to an outer circumferential edge of the body 2.

The body 2 has a crankshaft fastening part 4 formed in a central portion thereof by a drawing, and a torque converter fastening part 5 in a radially outer peripheral portion. The crankshaft fastening part 4 is formed with a total of six crankshaft fastening holes 4a arranged on a circle in an equi-spaced manner (i.e. at a pitch); and the torque converter fastening part 5, with a total of three torque converter fastening holes 5a arranged on a circle in an equi-spaced manner. This fastening part 5 further has rigidity-controlling first additional openings 5b formed in respective vicinities of the fastening holes 5a, so that its rigidity or flexibility can be set for an adjustment by changing shapes of the additional openings 5b in a various manner. This is for permitting the fastening part 5 as well as an adjacent portion thereto to have a controlled rigidness for an adequate followability to axial deformations of an associated torque converter 7 which repeats an expansion and a contraction with a varying hydraulic pressure therein.

The drive plate 1 is fixed on the one hand to an end part 6a of a crankshaft 6 with fixing bolts 6b inserted through the crankshaft fastening holes 4a and on the other hand to boss parts 7a of the torque converter 7 with fixing bolts 7b inserted through the torque converter fastening holes 5a, thereby for transmitting torque of the crankshaft 6 to the torque converter 7 and for absorbing positional variations of fixing points due to the expansion and the contraction of the torque converter 7.

The torque converter 7 deforming with a repeated expansion or contraction due to an internal hydraulic pressure has a thrust deformation. If the drive plate 1 was too rigid in an axial direction thereof, the torque converter's thrust deformation would affect the crankshaft fastening part 4 in a directly acting manner, imposing a great thrust load on a thrust bearing of the crankshaft 6. The thrust bearing might then be broken or damaged. To this point, the additional openings 5b effectively serve for absorbing the thrust deformation, with a moderate load, preventing larger thrust loads from being transmitted to the crankshaft 6.

To render the transmittable thrust load more moderate, there has been proposed a drive plate shown in FIG. 3. This conventional drive plate 1 has formed in a crankshaft fastening part 4 thereof a plurality of rigidity-controlling second additional openings 4b (six in total in the figure) arranged in an equi-spaced manner on a circle outside the crankshaft fastening holes 4a, for providing the fastening part 4 with an increased flexibility, so that a thrust load due to a deformation of a torque converter is additionally reduced to be transmitted to a crankshaft.

In the drive plate 1 of FIG. 3, however, the second additional openings 4b are all equi-spaced along a circle, by providing an interconnection region between a respective pair of circumferentially neighboring ones of the first additional openings 5b with a higher rigidity than vicinal regions of these additional openings 5b. On the other hand, as the drive plate 1 rotates, it has torsional moments acting thereon, generating stresses therein. Therefore, when the plate 1 is rotated, such stresses are concentrated on those vicinal regions of the first additional openings 5b that are designated by reference character A in FIG. 3, resulting in a tendency to provide the torque converter fastening part 5 with a reduced torsional strength.

SUMMARY OF THE INVENTION

The present invention has been achieved with such points in mind.

It therefore is an object of the present invention to provide a drive plate for vehicles, permitting a moderated concentration of stresses acting on vicinal regions of rigidity-controlling first additional openings due to a rotation of the drive plate, resulting in an improved durability.

To achieve the object, a first aspect of the invention provides a drive plate for vehicles including a crankshaft and a torque converter, the drive plate being adapted for transmitting a turning effect of the crankshaft to the torque converter and for absorbing a positional variation in a thrust direction between the crankshaft and the torque converter, the drive plate comprising a disk-like member having: a plurality of first holes arranged in a central portion thereof in a circumferentially spaced manner for a fixing thereof to the crankshaft; a plurality of second holes arranged in a radially outer portion thereof in a circumferentially spaced manner for a fixing thereof to the torque converter; a plurality of rigidity-controlling first openings arranged in respective vicinities of the second holes; and a total of rigidity-controlling second openings arranged simply between circumferentially neighboring ones of the first openings.

In a drive plate according to the first aspect, a rigidity-controlling second additional opening is formed between neighboring two of rigidity-controlling first additional openings, with a reduced rigidity between the two first openings, thus permitting a positional variation in a thrust direction to be absorbed with a reduced load. Moreover, the second opening also serves for absorbing a fraction of the positional variation, thus preventing a concentration of stresses at edge parts of the first openings, resulting in a decreased stress at each edge part.

When transmitting torque from a crankshaft to a torque converter, the drive plate has torsional moments acting thereon, with an increased deflection between a respective pair of neighboring first additional openings. Deflections due to torsional moments propagate toward second additional openings also. However, according to to the first aspect, edge parts of the first additional openings are protected against a concentration of such torsional stresses, and are each permitted to have a reduced stress, allowing an improved durability.

With an improved durability, the drive plate needs not to be subjected to a conventional surface hardening, such as by a gas nitriding, a toughening or a shot peening, and less costs, in addition to a possible light weight.

According to a second aspect of the invention, as it depends from the first aspect: the first openings are arranged substantially radially inside the second holes and shaped to be symmetrical with respect to a radial plane passing a center of a respective one of the second holes; and the second openings are substantially identical in radial position to the first openings.

According to the second aspect, first additional openings are formed radially inside of torque converter fastening holes, and second additional openings are substantially identical in radial position to the first openings. Therefore, stresses due to torsional moments are effectively dispersed among edge parts of the first and second openings in a rotating direction, so that those of the first openings each have a reduced stress.

While running, an associated torque converter is radially outwardly deformed by centrifugal forces, and the drive plate is thereby pulled in like directions, which otherwise might accompany significant tendencies to concentrate stresses along radially outer edges of the first openings.

However, according to the second aspect, the second openings are substantially identical in radial position to the first openings, so that such tendencies due to centrifugal forces are dispersed among the first and the second openings, permitting a reduced stress at each edge of the first openings.

According to a third aspect of the invention, as it depends from the second aspect: the first openings each have a pair of radially outwardly bulged end parts either at both sides of the radial plane; and the second openings each have a radially outer end part thereof radially outside the bulged end parts.

Therefore, stresses due to centrifugal forces are more born at the second opening side, giving the less stresses to edges of the first openings.

According to a fourth aspect of the invention, as it depends from any of the first to the third aspect, the disk-like member has a plate part formed with a pair of substantially parallel edges both defined by either of a side of an arbitrary one of the first openings and a side of one of the second openings neighboring thereto.

According to the fourth aspect, a plate part between a first opening and a second opening has both side edges thereof formed substantially in parallel to each other, and has an even deflection thereover, thus preventing stress concentrations at edge parts of the first openings as well as at those of the second openings, when a positional variation has developed in a thrust direction and/or torsional moments are acting. Accordingly, the first and the second openings have reduced stresses at their edges.

According to a fifth aspect of the invention. as it depends from the first aspect: the first openings are arranged substantially radially inside the second holes and shaped to be symmetrical with respect to a radial plane passing a center of a respective one of the second holes; and the second openings are arranged in a radially intermediate portion of the disk-like member between the first holes and the first openings.

According to the fifth aspect, a respective second opening is formed between a pair of circumferentially neighboring ones of first openings, within a radially intermediate range between the first openings and crankshaft fastening holes, thereby for reducing a rigidity in a torsional direction between the circumferentially neighboring first openings to moderate a concentration of stresses at edges of the first openings due to torsional moments generated by a rotation of the drive plate, thus permitting an increased torsional strength of the drive plate as well as an improved durability thereof. Moreover, a possible reduction in plate thickness allows the drive plate to be light-weighted.

According to a sixth aspect of the invention, as it depends from the fifth aspect, the second openings have two or three thereof each comprised of a circular hole and arranged between a respective pair of the circumferentially neighboring first openings.

According to the sixth aspect, edges of first openings are each subjected to a moderated stress concentration.

According to a seventh aspect of the invention, as it depends from the fifth aspect, the second openings each comprise a circumferentially elongate hole.

According to the seventh aspect also, edges of first openings are each subjected to a moderated stress concentration.

Further, to achieve the object described, a generic eighth aspect of the invention provides a drive plate for vehicles including a crankshaft and a torque converter, the drive plate comprising: in a radial direction thereof, an inner first central portion fixed to the crankshaft, a second central portion extending outside the first central portion, the second central portion being formed with an axially stepping outer circumferential part, a peripheral portion extending outside the second central portion, the peripheral portion being fixed to the torque converter at a plurality of fixing locations thereon, a ring gear integral with an outer circumferential part of the peripheral portion, a plurality of first openings formed in the peripheral portion for controlling an axial rigidity of the drive plate between the first central portion and the peripheral portion, and a plurality of second openings for additionally controlling the axial rigidity of the drive plate; and in a circumferential direction thereof, a plurality of connected sector portions of which a respective one is defined by neighboring ones of a plurality of substantially radially extending imaginary planes, every other one is fully solid over a first sectorial region where it intersects the second central portion, and has one of the first openings and one of the fixing locations in a second sectorial region where it intersects the peripheral portion, and every remaining one is formed with a corresponding one of the second openings in a third sectorial region where it intersects the second central portion and the peripheral portion.

According to the eighth aspect, a drive plate is composed of: a first central portion fixed to a crankshaft; and a number of fan-like portions of which a respective one is constituted at one side thereof with a combination of a fully solid and axially stepped first sectorial region and a second sectorial region, which is fixed to a torque converter and formed with a first opening, and at the other side thereof with an axially stepped third sectorial region formed with a second opening.

Accordingly, stress concentrations are geometrically moderated, giving like effects to the first aspect.

According to a ninth aspect (FIGS. 4 to 6) of the invention, as it depends from the eighth aspect: the second openings each comprise a round hole; and the third sectorial region has the corresponding second opening and another that corresponding one of the second openings formed in a subregion thereof where it intersects the second central portion.

According to the ninth aspect, there are provided like effects to the fifth and the sixth aspect.

According to a tenth aspect (FIG. 7) of the invention, as it depends from the eighth aspect: the second openings each comprise a circumferentially elongate hole, and the third sectorial region has the corresponding second opening formed in a subregion thereof where it intersects the second central portion.

According to the tenth aspect, there are provided like effects to the fifth and the seventh aspect.

According to an eleventh aspect (FIG. 8) of the invention, as it depends from the eighth aspect, the second openings are each bell-like shaped.

According to the eleventh aspect, there are provided like effects to the second and the third aspect.

According to a twelfth aspect (FIG. 9 and 10) of the invention, as it depends from the eighth aspect: the peripheral portion has an axially stepping radially intermediate part; and the third sectorial region has the corresponding second opening formed in a subregion thereof where it intersects the peripheral portion.

According to the twelfth aspect, there are provided like effects to the second and the fourth aspect.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
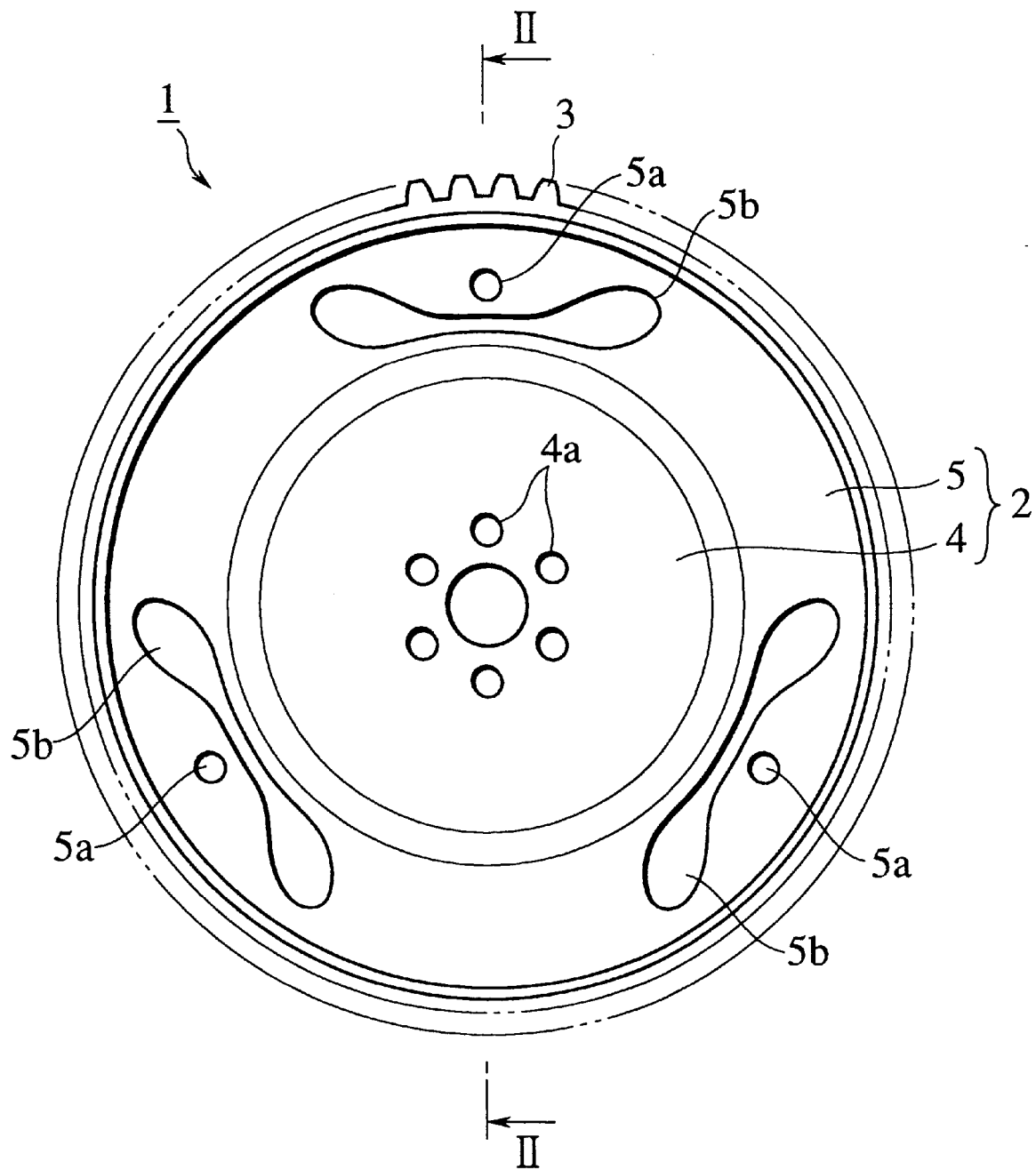
FIG. 1 is a front view of a conventional drive plate for vehicles.

There will be detailed below the preferred embodiments of the present invention with reference to FIGS. 4 to 10. Like members are designated by like reference characters.

Figure 2:
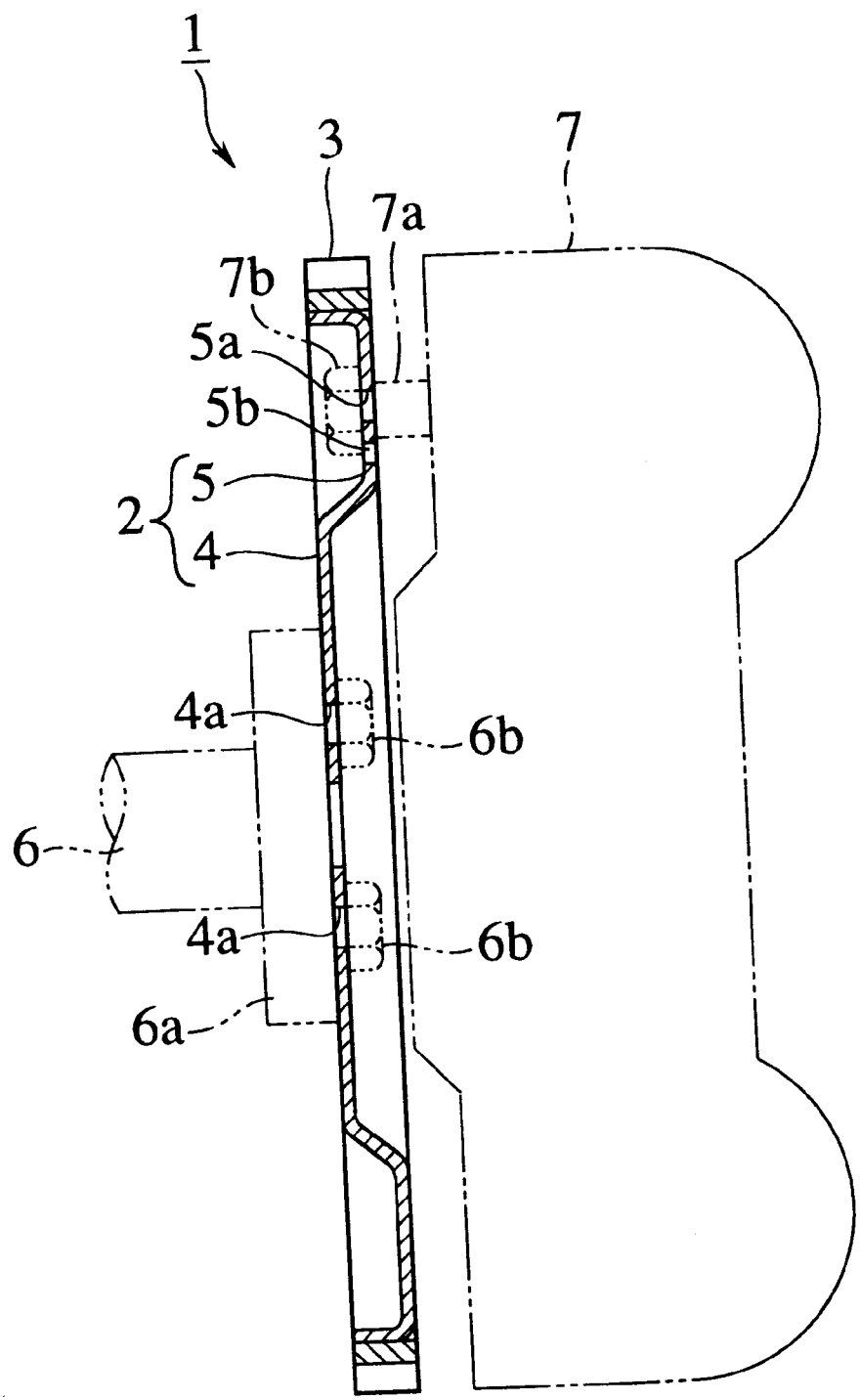
FIG. 2 is a section along line II—II of FIG. 1.
Figure 3:
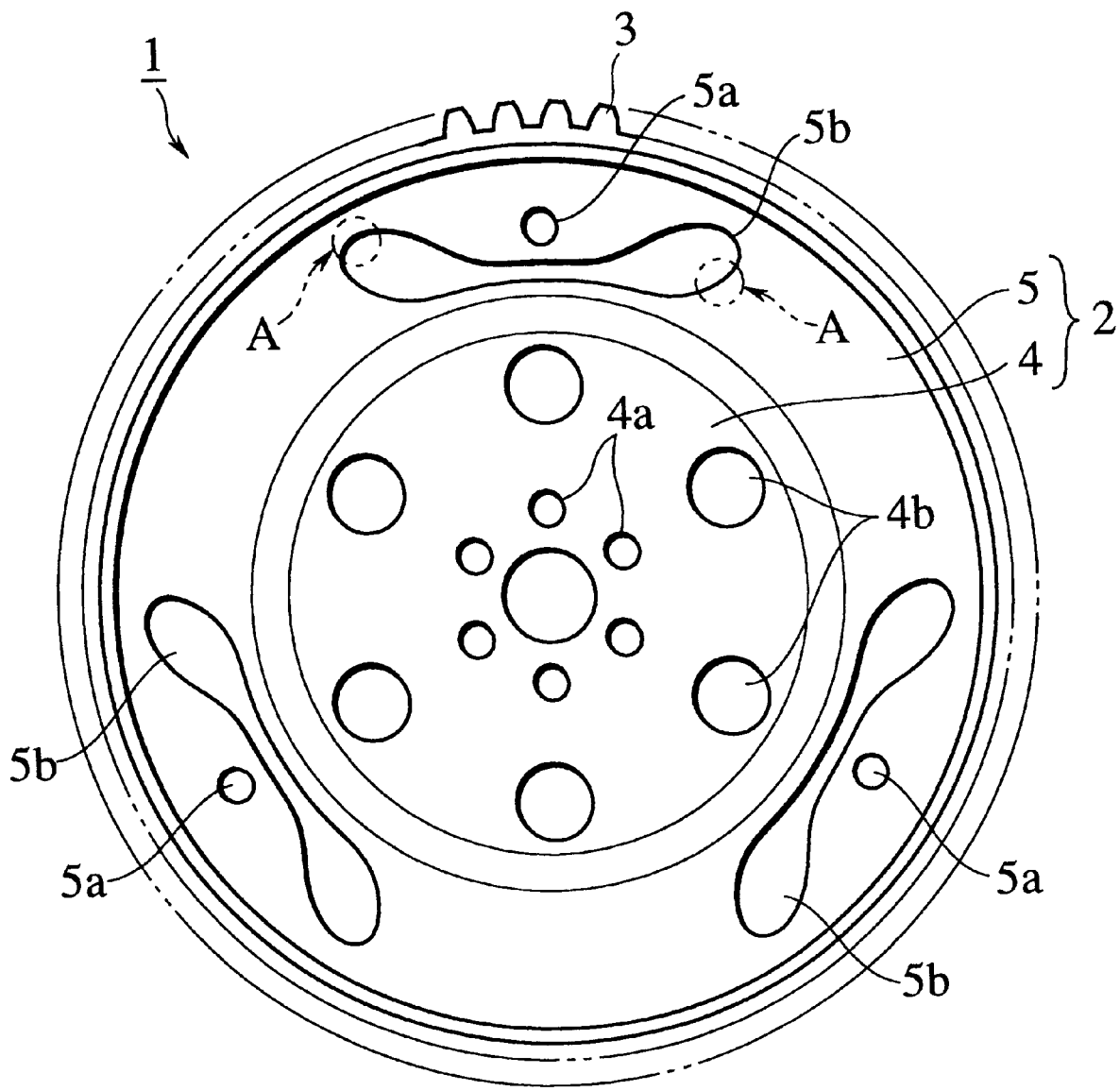
FIG. 3 is a front view of another conventional drive plate for vehicles.

FIGS. 1 and 2 illustrate a drive plate for vehicles according to a first embodiment of the invention.

In the figures, designated at reference character E is the drive plate, which comprises a disk-like member having: a plurality of crankshaft fastening holes 13 arranged in a central portion thereof in a circumferentially spaced manner for a fixing thereof to a crankshaft 6; a plurality of torque converter fastening holes 14 arranged in a radially outer portion thereof in a circumferentially spaced manner for a fixing thereof to a torque converter 7; and a plurality of rigidity-controlling first additional openings 15 arranged in respective vicinities of the torque converter fastening holes 14. The drive plate E is adapted for transmitting a turning effect (i.e. torque) of the crankshaft 6 to the torque converter 7, and for absorbing a thrust load of the torque converter 7.

In the present invention, the drive plate E has a plurality of rigidity-controlling second additional openings 16 all arranged between a corresponding pair of circumferentially neighboring ones of the rigidity-controlling first additional openings 15. In the first embodiment as well as in a subsequent embodiment, the second additional openings 16 are arranged in a radially intermediate portion of the disk-like member between the crankshaft fastening holes 13 and the first additional openings 15.

Figure 4:
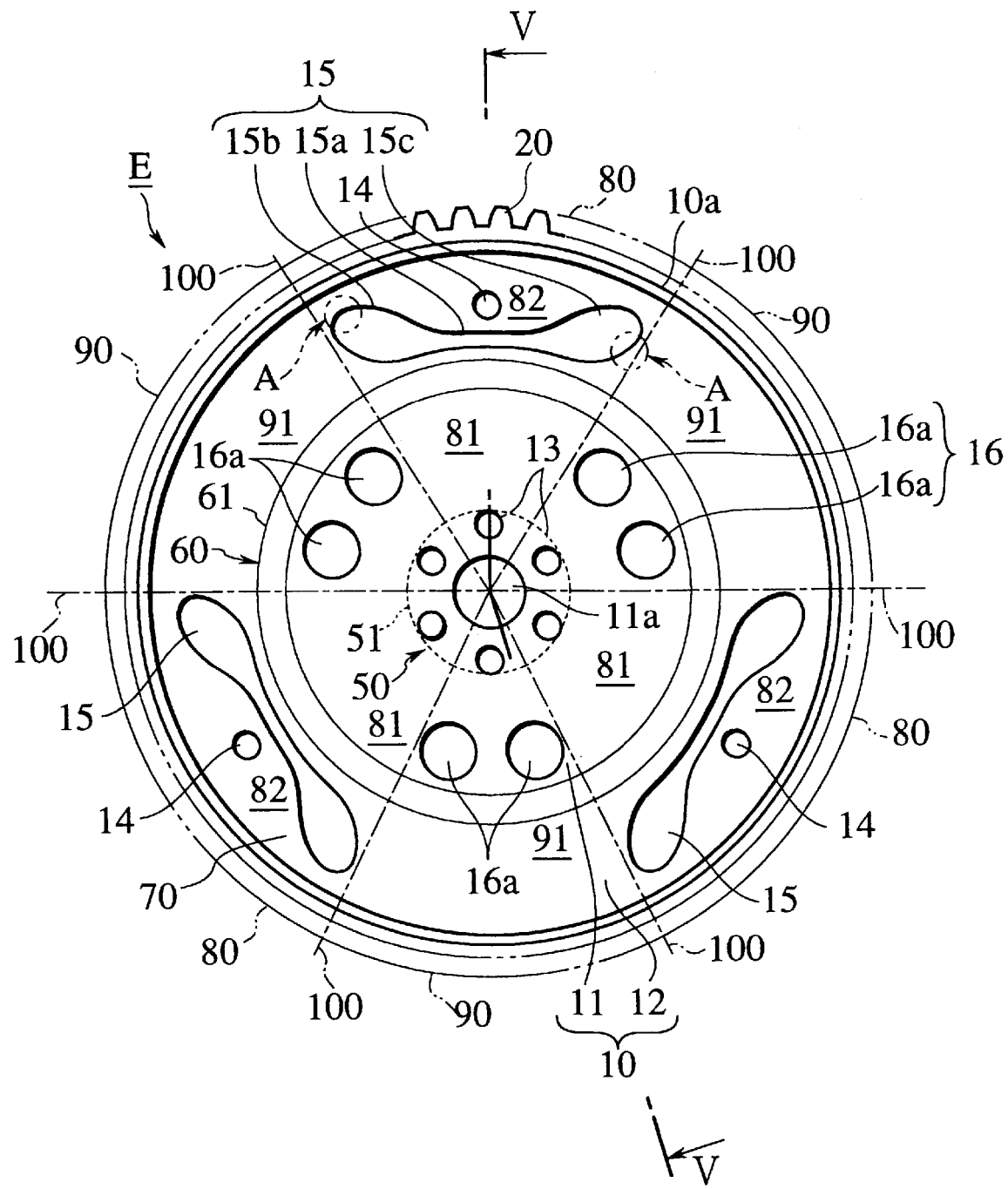
FIG. 4 is a front view of a drive plate for vehicles according to a first embodiment of the invention.
Figure 5:
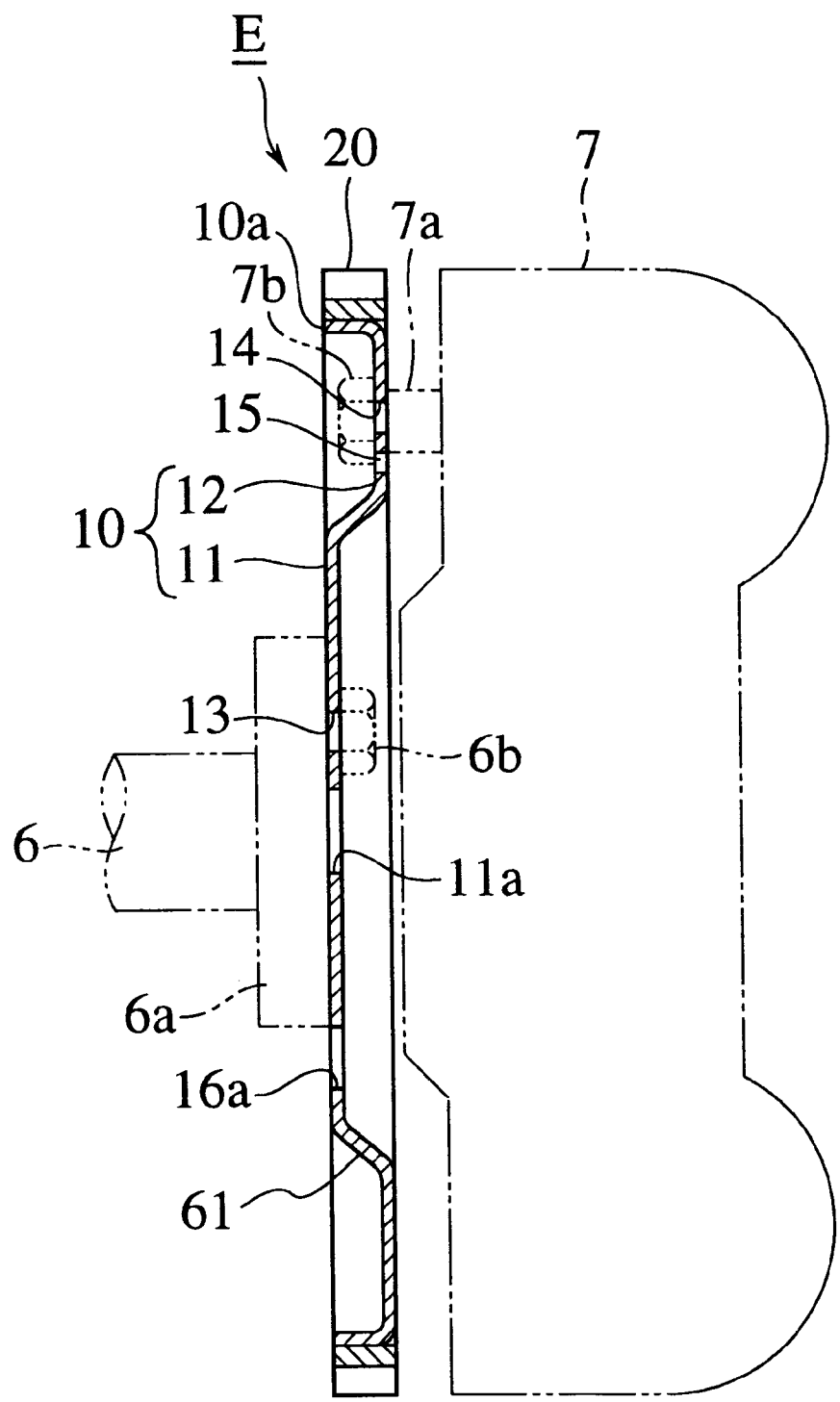
FIG. 5 is a section along line V—V of FIG. 4.

In the first embodiment shown in FIGS. 4 and 5, a total of six rigidity-controlling second additional openings 16 are each comprised of a circular hole 16a, and are arranged on a circle and grouped into pairs to be each located between a respective pair of circumferentially neighboring ones of a total of three rigidity-controlling first additional openings 15.

More specifically, the drive plate E comprises a body 10 formed from a metallic disk by a plastic working, and a ring gear 20 integrally joined to be fixed by a welding to a flange 10a formed on an outer circumferential edge of the body 10. The ring gear 20 may be integrally formed by a plastic working to the outer circumferential edge.

The body 10 has a crankshaft fastening portion 11 formed as a central portion thereof by a drawing, and a torque converter fastening portion 12 as a radially outer peripheral portion thereof. The crankshaft fastening portion 11 is formed with the plurality of crankshaft fastening holes 13, e.g. six in total, arranged in an equi-angularly spaced manner on a circle concentric with the body 10, and has a through hole 11a formed at a center thereof.

The torque converter fastening portion 12 is formed with the plurality of torque converter fastening holes 14, e.g. three in total, arranged in an equi-angularly spaced manner on a circle concentric with the body 10. This fastening portion 12 has the rigidity-controlling first additional openings 15 formed in vicinities of the torque converter fastening holes 14, respectively. The first additional openings 15 are shaped to be each symmetrical between left and right sides of an imaginary straight line extending from a rotation center of the body 10 through a center of a corresponding one of the torque converter fastening holes 14, i.e. symmetrical with respect to an imaginary radial plane including the imaginary straight line, and each comprise an arcuate part 15a and a pair of bulged parts 15b, 15c located either at both ends of the arcuate part 15a. The arcuate part 15a is located radially inside the corresponding torque converter fastening hole 14, and extends along a circle concentric with the body 10. The bulged parts 15b, 15c radially outwardly project from inner edges of the arcuate part 15a toward an outer circumference of the body 10.

The torque converter fastening holes 14 as well as the rigidity-controlling first additional openings 15 are three in total in FIG. 4, but may be four in total.

The paired rigidity-controlling second additional openings 16 comprise two circular holes 16a arranged on the circle lying in the crankshaft fastening portion 11, which circle is concentric to the body 10. The two circular holes 16a are located merely within a range between a corresponding pair of circumferentially neighboring ones of the rigidity-controlling first additional openings 15, in a radially intermediate portion of the body 10 between these openings 15 and the crankshaft fastening holes 13.

The drive plate E is fixed on the one hand to an end part 6a of the crankshaft 6 with fixing bolts 6b inserted through the crankshaft fastening holes 13 and on the other hand to boss parts 7a of the torque converter 7 with fixing bolts 7b inserted through the torque converter fastening holes 14, thereby for transmitting torque of the crankshaft 6 to the torque converter 7 and for absorbing positional variations in a thrust direction of the torque converter 7.

In the drive plate E according this embodiment, the rigidity-controlling first additional openings 15 formed in the torque converter fastening portion 12 provide a flexibility around each torque converter fastening hole 14, allowing the positional thrust variations of the torque converter 7 to be absorbed with a small load, permitting circumferences of the torque converter fastening holes 14 to have a reduced bending stress.

Moreover, the rigidity-controlling second additional openings 16 formed in the crankshaft fastening portion 11 provides a flexibility to this portion 11, allowing an enhanced absorption of the positional thrust variations.

Further, the rigidity-controlling second additional openings 16 are each formed between circumferentially neighboring two of the rigidity-controlling first additional openings 15, within the radially intermediate portion between the these first additional openings 16 and the crankshaft fastening holes 13, allowing respective circumferences of the second additional openings 16 to have a smaller torsional rigidity than those plate parts lying radially inside the first additional openings 15, thereby permitting a moderated concentration of stresses at edges A of the first additional openings 15 due to torsional stresses caused by a rotation of the drive plate E, thus achieving an increased strength, resulting in an improved durability, as well as a possible reduction in thickness of the disk-like member permitting the drive plate E to be light-weighted and worked in form in a facilitated manner.

In another aspect, the drive plate E comprises: in a radial direction thereof, an inner first central portion 50 fixed to the crankshaft 6, a second central portion 60 (=11 minus 50 in FIG. 4) extending outside the first central portion 50, the second central portion 60 being formed with an axially stepping outer circumferential part 61, a peripheral portion 70 (=12 in FIG. 4) extending outside the second central portion 60, the peripheral portion 70 being fixed to the torque converter 7 at a plurality of fixing locations 14 thereon, a ring gear 20 integral with an outer circumferential part 10a of the peripheral portion 70, a plurality of first openings 15 formed in the peripheral portion 70 for controlling an axial rigidity of the drive plate E between the first central portion 50 and the peripheral portion 70, and a plurality of second openings 16 for additionally controlling the axial rigidity of the drive plate E; and in a circumferential direction thereof, a plurality of connected sector portions 80, 90 of which a respective one is defined by neighboring ones of a plurality of substantially radially extending imaginary planes 100, every other one 80 is fully solid over a first sectorial region 81 where it intersects the second central portion 60, and has one of the first openings 15 and one of the fixing locations 14 in a second sectorial region 82 where it intersects the peripheral portion 70, and every remaining one 90 is formed with a corresponding one of the second openings 16 in a third sectorial region 91 where it intersects the second central portion 60 and the peripheral portion 70.

The first central portion 50 has a circumferential marginal part 51 circumscribed to the crankshaft fastening holes 13.

According to this aspect, the drive plate E is composed of: a first central portion 50 fixed to the crankshaft 6; and a number of fan-like portions 81+82+91 of which a respective one is constituted at one (80) side thereof with a combination of the fully solid and axially stepped first sectorial region 81 and the second sectorial region 82, which is fixed to the torque converter 7 and formed with the first opening 15, and at the other (90) side thereof with the axially stepped third sectorial region 91 formed with the second opening 16.

Accordingly, stress concentrations are geometrically moderated, giving like effects to the first embodiment.

Figure 6:
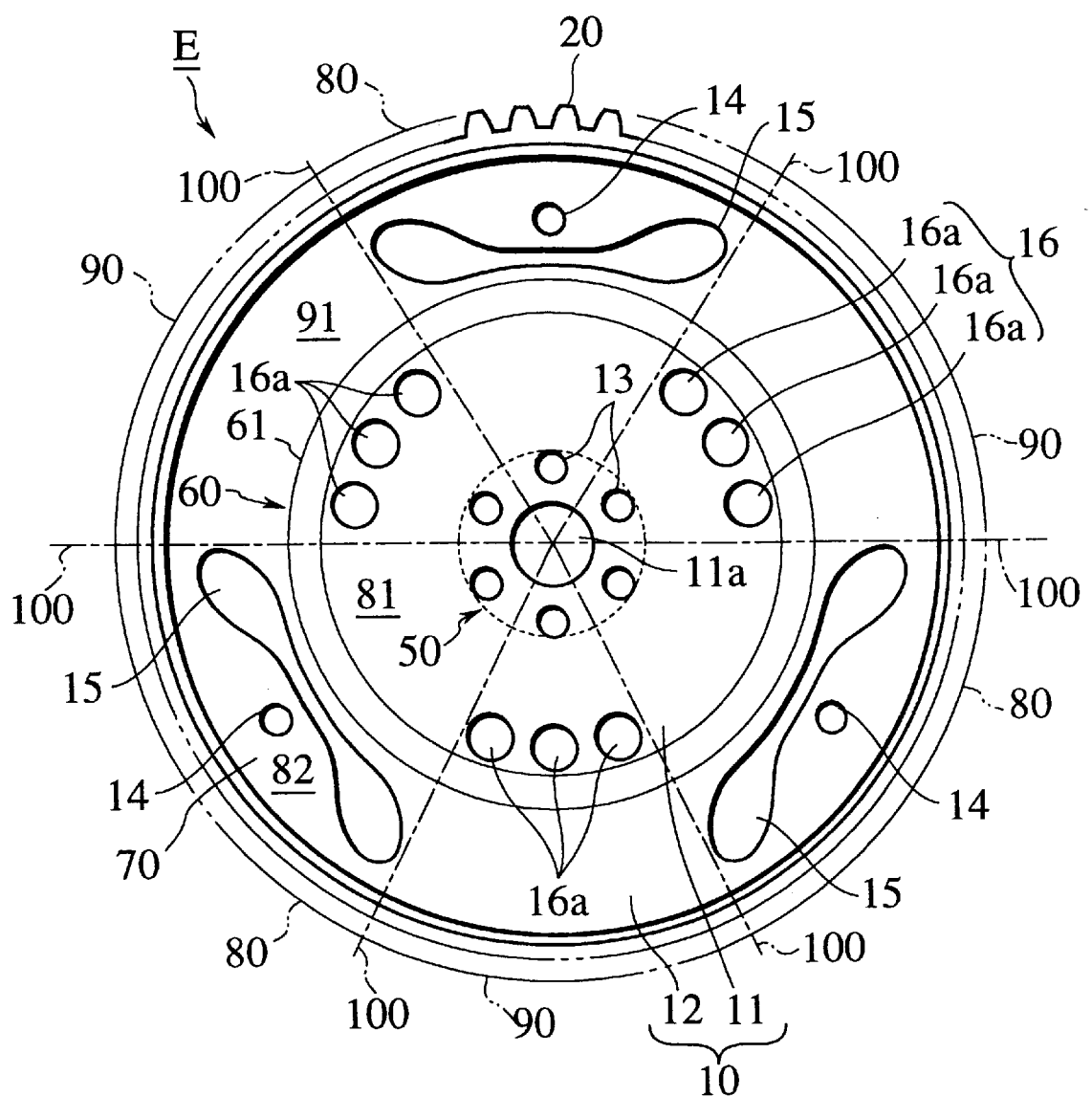
FIG. 6 is a front view of a drive plate for vehicles according to a modification of the first embodiment of the invention.

FIG. 6 shows a modification of the first embodiment, in which a total of nine rigidity-controlling second additional openings 16 are each comprised of a circular hole 16a, and are arranged on a circle and grouped into triples to be each located between a respective pair of circumferentially neighboring ones of a total of three rigidity-controlling first additional openings 15. The second additional openings 16 may have their diameters different among tripled circular holes 16a.

Figure 7:
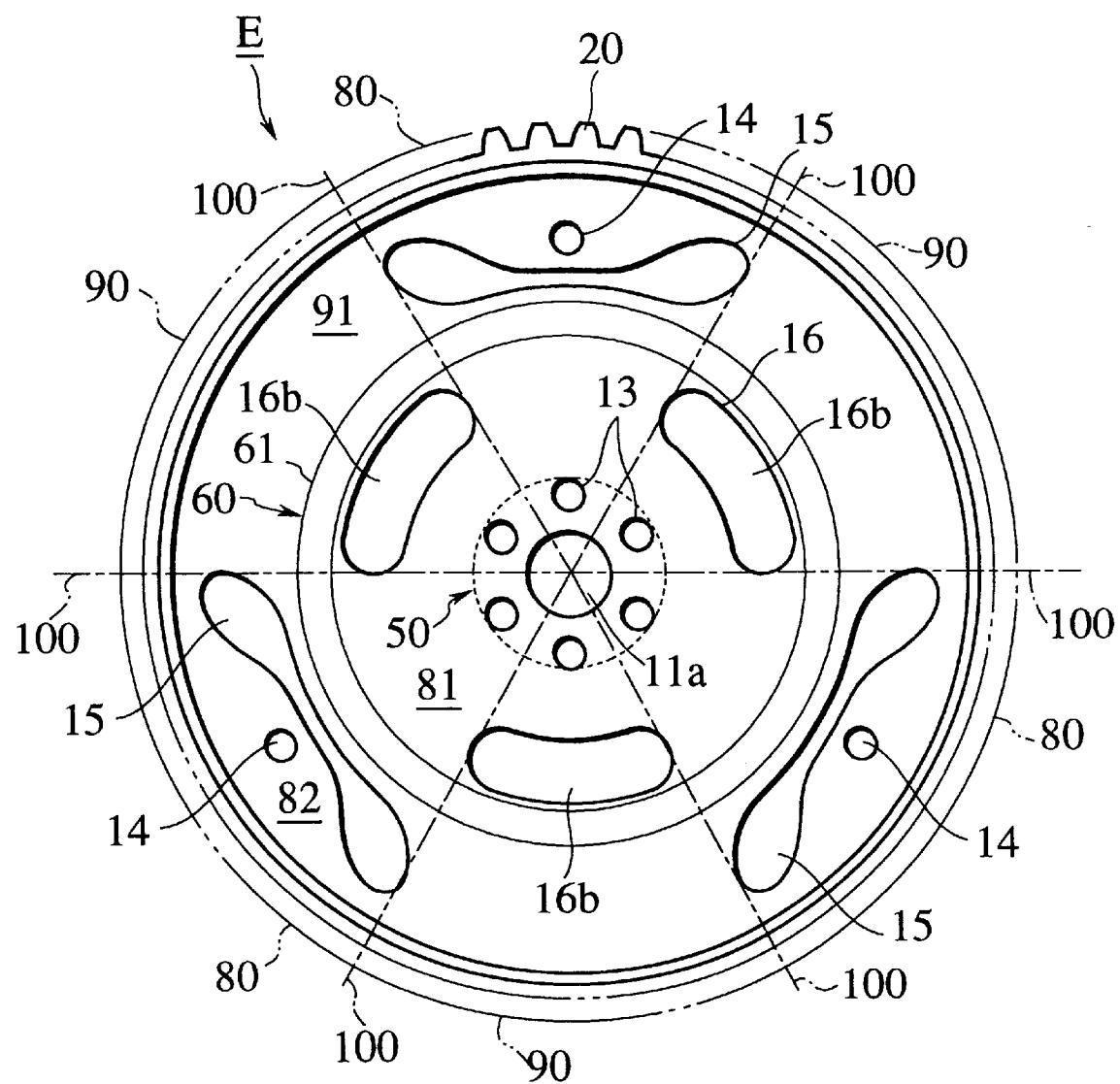
FIG. 7 is a front view of a drive plate for vehicles according to a second embodiment of the invention.

FIG. 7 shows a drive plate E according to a second embodiment of the invention, which is different from the first embodiment in that a total of three rigidity-controlling second additional openings 16 are formed in a second central portion 60, each respectively as a circumferentially elongate hole 16b.

Figure 8:
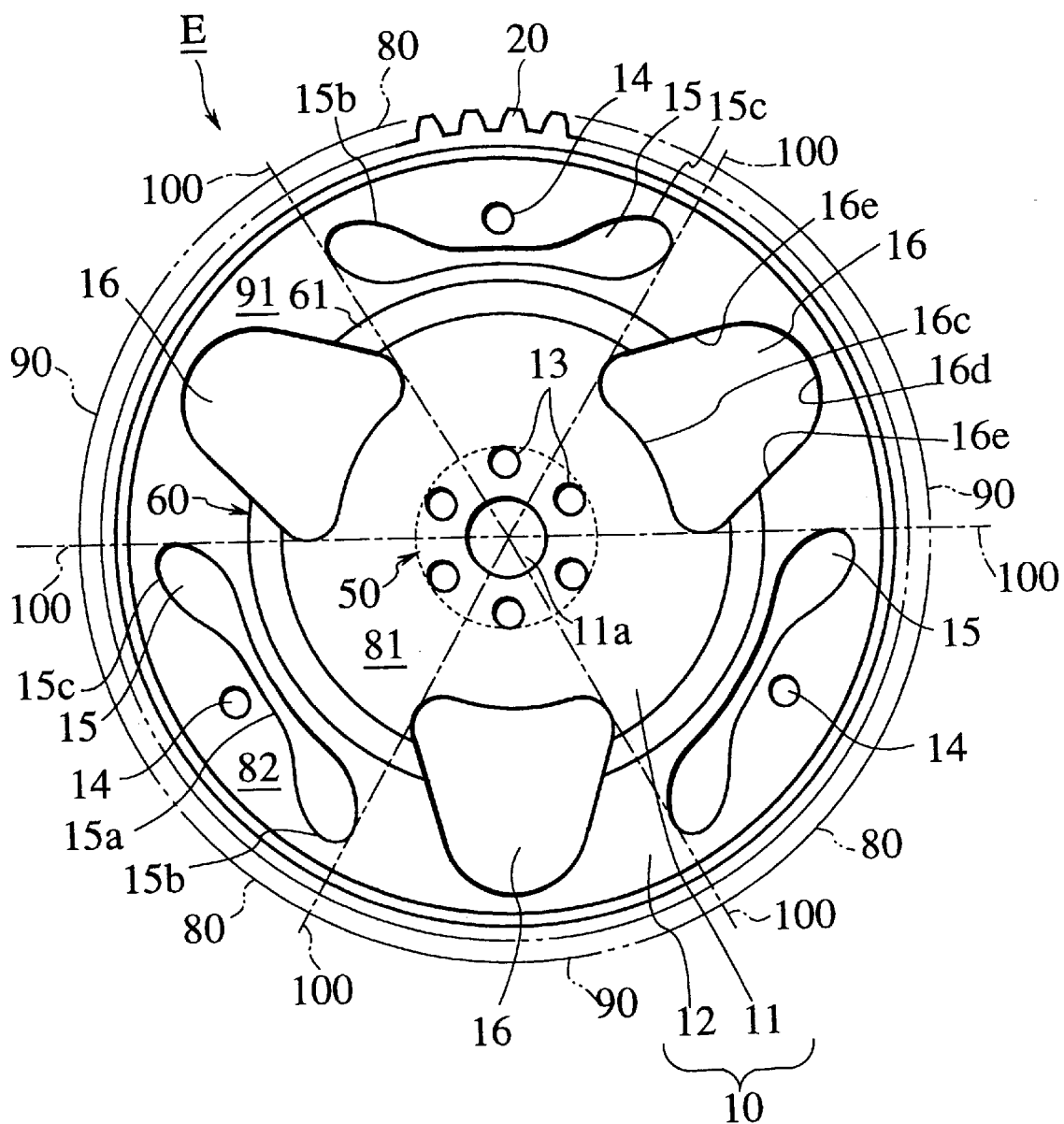
FIG. 8 is a front view of a drive plate for vehicles according to a third embodiment of the invention.

FIG. 8 shows a drive plate E according to a third embodiment of the invention, which is different from the first embodiment in that a total of three rigidity-controlling bell-like second additional openings 16 are formed in a total of three third sectorial regions 91.

In this embodiment, the rigidity-controlling second additional openings 16 are each formed between neighboring ones of rigidity-controlling first additional openings 15, stretching over both of a crankshaft fastening portion 11 and a torque converter fastening portion 12. In other words, each second additional opening 16 has an arcuate base part 16c located in the crankshaft fastening portion 11, and a combination of an arcuate top part 16d and oblique side edge parts 16e located in the torque converter fastening portion 12.

The arcuate base part 16c constitutes part of a circumference concentric with a body 10, and is connected via round vertices to the obliqiue side edges 16e. The top part 16d is arcuately shaped in a radially outwardly bulged manner to have a summit part at substantially the same radial position as bulged parts 15b, 15c of the first additional openings 15.

In the drive plate E according to this embodiment, each pair of neighboring first additional openings 15 have therebetween a reduced rigidity due to a second additional opening 16 located there. Therefore, positional variations in a thrust direction are absorbable with a small load. Moreover, part of such variations can be absorbed at the second additional opening 16, as well. Accordingly, an effective prevention is permitted against a concentration of stresses at edges of the first additional openings 15 due to positional variations in the thrust direction. Those edges thus have reduced stresses.

Further, each pair of neighboring first additional openings 15 have therebetween an increased deflection, when subjected to torsional moments acting there due to a transmission of torque from a crankshaft 6 to a torque converter 7. Deflections due to torsional moments are thus dispersed also around the second additional opening 16, permitting a prevention against a concentration of stresses at edges of the first additional openings 15. Therefore, such the stress concentration is moderated at those edges, permitting an improved durability of drive plate.

With the improved durability, the drive plate does not need a conventional surface hardening, such as a gas nitriding, a toughening or a shot peening, resulting in a reduced cost. The improved durability further permits a light-weighted design.

Figure 9:
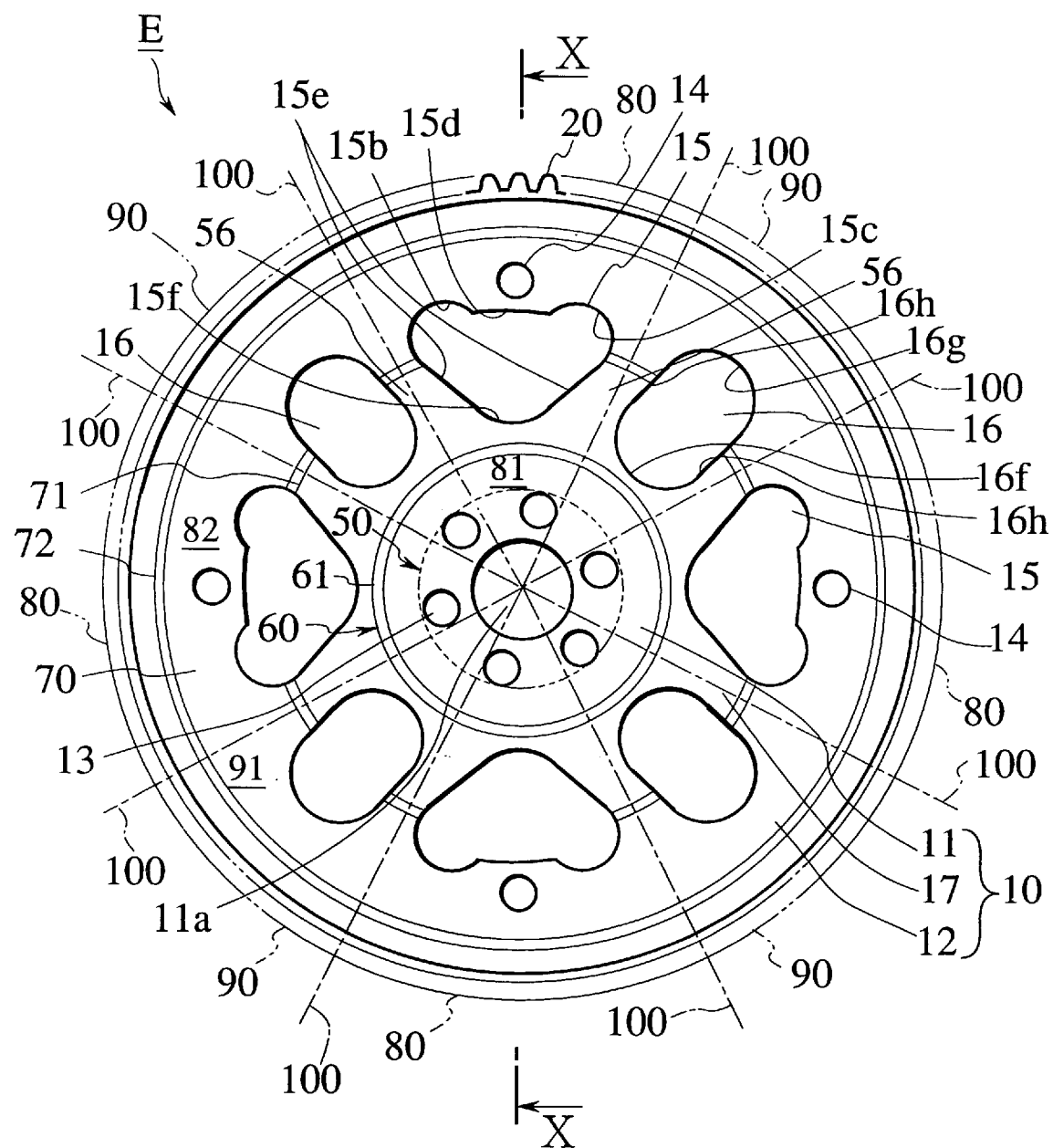
FIG. 9 is a front view of a drive plate for vehicles according to a fourth embodiment of the invention.
Figure 10:
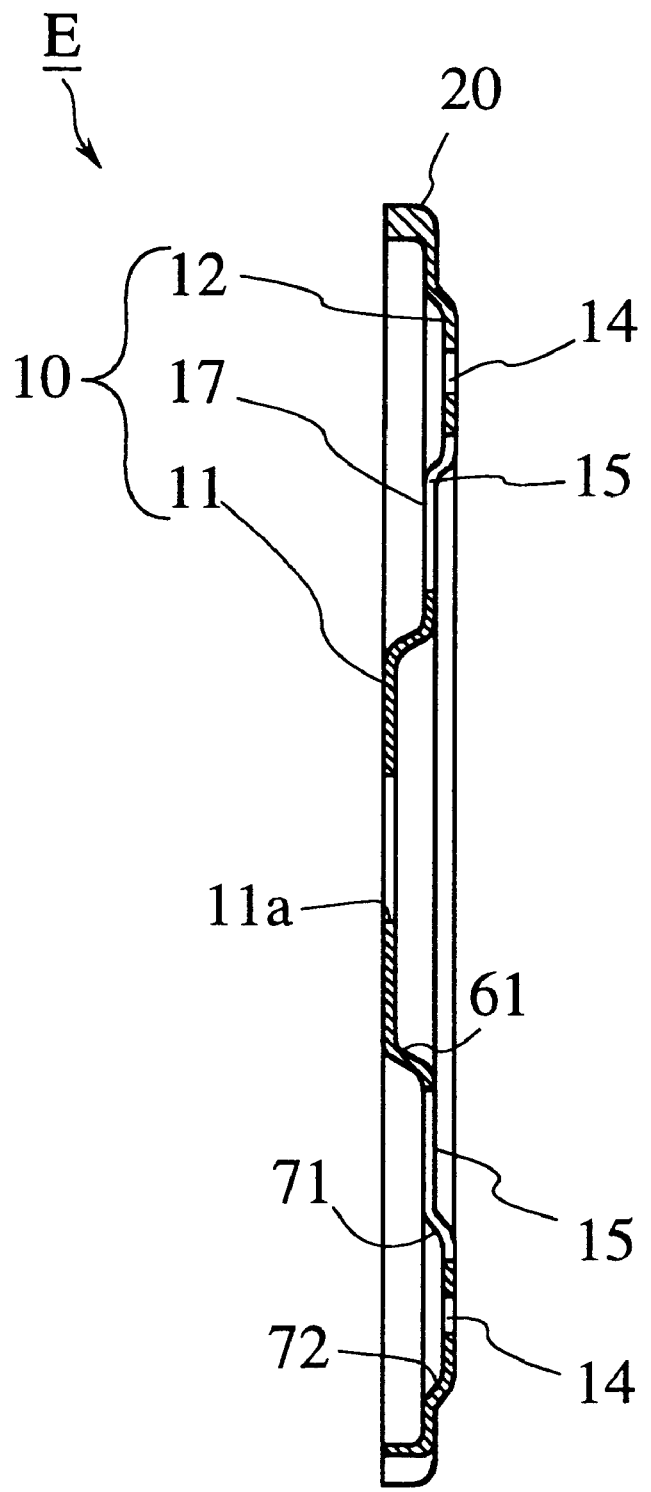
FIG. 10 is a section along line X—X of FIG. 9.

FIGS. 9 and 10 show a drive plate E for vehicles according to a fourth embodiment of the invention, which is different from the third embodiment in that: a peripheral portion 70 of a body 10 has a radially inner axial step 71 and a radially outer axial step 72; a total of four rigidity-controlling first additional openings 15 are shaped in a modified manner; a total of four rigidity-controlling second additional openings 16 also are shaped in a modified manner; and the four second additional openings 16 are each located in a radially outer subregion of a third sectorial region 91, where an associated sector portion 90 intersects the peripheral portion 70.

The radially inner axial step 71 crosses central parts of all the first and second additional openings 15, 16, permitting an increased flexibility The body 10 has a radially intermediate stage portion 17 formed by a drawing between a crankshaft fastening portion 11 and a torque converter fastening portion 12. The first additional openings 15 and the second additional openings 16 are all formed within a radial range stretched over part of the intermediate stage portion 17 and part of the torque converter fastening portion 12.

The rigidity-controlling first additional openings 15 are each located radially inside of a corresponding torque converter fastening hole 14 and shaped to be symmetrical with respect to an imaginary radial plane passing a center of the torque converter fastening hole 14, with a pair of radially outwardly bulged parts either at both sides of the radial plane. In other words, each first additional opening 15 has: an arcuate outside part 15d formed radially inside the torque converter fastening hole 14; a pair of bulged parts 15b, 15c either connected at one end to both ends of the outside part 15d; and a pair of side edge parts 15e extending from the other ends of the bulged parts 15b, 15c toward a rotation center of the drive plate E, approaching each other in a triangle describing manner.

The arcuate outside part 15d constitutes part of a circumference concentric with the body 10. The bulged parts 15b, 15c are smaller in radially outward bulging than corresponding parts in any of the first to the third embodiment. The bulged parts 15b, 15c may be modified as simple arcuate parts extending from both ends of the outside part, without bulging, to be naturally or smoothly connected to the side edge parts 15e. The side edge parts 15e are smoothly interconnected at their radially inner ends with each other, by a round vertex part 15f.

The rigidity-controlling second additional openings 16 each comprise an arcuate base part 16f, an arcuate top part 16g, and a pair of side edge parts 16h interconnecting the base part 16f and the top part 16g.

The base part 16f is shaped to be arcuate in a radially inwardly bulged manner to have an innermost part thereof in substantially the same radial position as the round vertex part 15f of each first additional opening 15. The top part 16g is shaped to be arcuate in a radially outwardly bulged manner to have an outermost part thereof in a radial position radially outwardly slightly exceeding the bulged parts 15b, 15c of each first additional opening 15. The outermost part of the arcuate top part 16g may be located in substantially the same radial position as the bulged parts 15b, 15c of first additional opening 15.

A respective one of the first additional openings 15 and one of the second additional openings 16 neighboring thereto have therebetween a plate part 56 defined at both sides thereof by either of the side edge part 15e and the side edge part 16h substantially parallel to each other.

In the drive plate E according to this embodiment, each rigidity-controlling first additional opening 15 is formed radially inside of a torque converter fastening hole 14 and located in substantially the same radial position as each rigidity-controlling second additional opening 16 so that stresses due to torsional moments, which otherwise might have been concentrated, can be substantially evenly dispersed between a side edge part 15e of the first additional opening 15 and a side edge part 16h of the second additional opening 16, permitting a reduced stress at such the edge part of first additional opening.

While running, an associated torque converter 7 is radially outwardly deformed by centrifugal forces, and the body 10 also is radially outwardly pulled by centrifugal forces.

Therefore, there may arise tendencies to concentrate stresses due to such centrifugal forces along radially outermost parts of each first additional opening 15 and each second additional opening 16, i.e. the bulged parts 15b, 15c and the arcuate top part 16g. In this embodiment, however, the arcuate top part 16g of each second additional opening 16 is positioned radially outside the bulged parts 15b, 15c of each first additional opening 15, so that a distance between this opening 15 and an outer circumference of the body 10 measures wider, permitting a reduced stress to develop at edges of the opening 15 due to centrifugal forces.

Moreover, the plate part 56 between first and second additional openings 15, 16 has their edge parts 15e, 16h as its both sides substantially parallel to each other, allowing an even deflection to develop. A concentration of stress is thus effectively preventable at such the edge of first additional opening 15 as well as that of second additional opening 16 with thrust deformations and/or torsional moments acting thereon. Therefore, the edges of first and second additional openings 15, 16 are permitted to have reduced stresses.

In other words, locations of maximal stresses due to positional variations in a thrust direction, torsional moments and centrifugal forces are favorably dispersed by a particular arrangement of rigidity-controlling first and second additional openings 15, 16, among different marginal parts therearound, permitting an increased strength and an improved durability.

It will be seen that in the foregoing embodiments of the invention, the axially drawn steps 61 and/or 71, 72 (in particular the latter steps 71, 72) may be replaced by plain flat plate parts.

While preferred embodiments of the present invention have been described using specific terms, such description is for illustrative purposes, and it is to be understood that changes and variations may be made without departing from the spirit or scope of the following claims.

What is claimed is:

1. A drive plate for vehicles including a crankshaft and a torque converter, the drive plate being adapted for transmitting a turning effect of the crankshaft to the torque converter and for absorbing a positional variation in a thrust direction between the crankshaft and the torque converter, the drive plate comprising a disk-like member having:

a plurality of first holes arranged in a central portion thereof in a circumferentially spaced manner for a fixing thereof to the crankshaft;

a plurality of second holes arranged in a radially outer portion thereof in a circumferentially spaced manner for a fixing thereof to the torque converter;

a plurality of rigidity-controlling first openings arranged in respective vicinities of the second holes, the first openings having a first opening configuration; and rigidity-controlling second openings arranged between circumferentially neighboring ones of the first openings, the second openings having a second opening configuration different from the first opening configuration.

2. A drive plate according to claim 1, wherein:

the first openings are arranged substantially radially inside the second holes and shaped to be symmetrical with respect to a radial plane passing a center of a respective one of the second holes; and the second openings are substantially identical in radial position to the first openings.

3. A drive plate according to claim 2, wherein:

the first openings each have a pair of radially outwardly bulged end parts either at both sides of the radial plane; and the second openings each have a radially outer end part thereof radially outside the bulged end parts.

4. A drive plate according to claim 2, wherein the disk-like member has a plate part formed with a pair of substantially parallel edges both defined by either of a side of an arbitrary one of the first openings and a side of one of the second openings neighboring thereto.

5. A drive plate according to claim 1, wherein the disk-like member has a plate part formed with a pair of substantially parallel edges both defined by either of a side of an arbitrary one of the first openings and a side of one of the second openings neighboring thereto.

6. A drive plate according to claim 1, wherein:

the first openings are arranged substantially radially inside the second holes and shaped to be symmetrical with respect to a radial plane passing a center of a respective one of the second holes; and the second openings are arranged in a radially intermediate portion of the disk-like member between the first holes and the first openings.

7. A drive plate according to claim 6, wherein:

the second openings including a plurality of openings comprised of each comprised of a circular hole and arranged between a respective pair of the circumferentially neighboring first openings.

8. A drive plate according to claim 6, wherein:

the second openings each comprise a circumferentially elongate hole.

9. A drive plate for vehicles including a crankshaft and a torque converter, the drive plate comprising, in a radial direction thereof, an inner first central portion fixed to the crankshaft;

a second central portion extending radially outside the first central portion, the second central portion being formed with an axially stepping outer circumferential part;

a peripheral portion extending radially outside the second central portion, the peripheral portion being fixed to the torque converter at a plurality of fixing locations thereon;

a ring gear integral with an outer circumferential part of the peripheral portion;

a plurality of first openings formed in the peripheral portion for controlling an axial rigidity of the drive plate between the first central portion and the peripheral portion; and a plurality of second openings for additionally controlling the axial rigidity of the drive plate, the drive plate comprising, in a circumferential direction thereof, a plurality of connected sector portions of which a respective sector portion is defined by neighboring sector portions of a plurality of substantially radially extending imaginary planes and of which every other sector portion is fully solid over a first sectorial region where the every other sector portion intersects the second central portion, and has one of the first openings and one of the fixing locations in a second sectorial region where the every other sector portion intersects the peripheral portion, and every remaining sector portion is formed with a corresponding one of the second openings in a third sectorial region where every remaining section portion intersects the second central portion and the peripheral portion.

10. A drive plate according to claim 9 wherein:

the second openings each comprise a round hole; and the third sectorial region has the corresponding second opening and another said corresponding one of the second openings formed in a subregion thereof where it intersects the second central portion.

11. A drive plate according to claim 9, wherein:

the second openings each comprise a circumferentially elongate hole, and the third sectorial region has the corresponding second opening formed in a subregion thereof where it intersects the second central portion.

12. A drive plate according to claim 9, wherein:

the second openings are each bell-like shaped.

13. A drive plate according to claim 9, wherein:

the peripheral portion has an axially stepping radially intermediate part; and the third sectorial region has the corresponding second opening formed in a subregion thereof where the third sectorial region intersects the peripheral portion.

14. A drive plate for connection between a crankshaft and a torque converter of a vehicle, said drive plate comprising, a circumferential array of an even number of adjacent sectors, each of said sectors defined by radially extending planes;

a first central portion including a circular array of crankshaft fastening holes for mounting to a crankshaft, each of said crankshaft fastening holes formed in one of said sectors;

a second central portion extending radially outside said first central portion, said second central portion being formed with an axially stepping outer circumferential part, a peripheral portion extending radially outside said second central portion, said peripheral portion including a plurality of fixing locations for mounting said drive plate to a torque converter, said fixing locations positioned in alternate ones of said adjacent sectors;

a ring gear integral with said peripheral portion;

a plurality of first additional openings formed in said peripheral portion in said alternate ones of said adjacent sectors and shaped for controlling an axial rigidity of the drive plate between said first central portion and said peripheral portion; and a plurality of second additional openings each positioned between said first additional openings in the other alternate ones of said adjacent sectors and shaped for additionally controlling the axial rigidity of the drive plate, said alternate ones of said adjacent sectors being fully solid over a first sectorial region where said alternate ones of said sectors intersect said second central portion, and has one of the first additional openings and one of said fixing locations in a second sectorial region where said alternate ones of said adjacent sectors intersect said peripheral portion, and said other alternate ones of said adjacent sectors being formed with one of said second additional openings in a third sectorial region where said other alternate ones intersect said second central portion and said peripheral portion.

15. A drive plate according to claim 14, wherein:

the second additional opening is substantially identical to the first additional opening in radial location; and the second additional opening configuration comprises a figure consisting of a generally oval form.

16. A drive plate according to claim 15, wherein the first additional opening configuration comprises a figure having side edge parts such that one of the side edge parts of the figure of the first additional opening configuration and a side edge part of the figure of the second additional opening configuration has at either circumferential side thereof radially extending parts being substantially parallel to each other.

17. A drive plate according to claim 16, wherein the outside part of the figure of the first opening configuration comprises:

a circumferentially intermediate part; and the circumferential end parts thereof radially outwardly bulged from both ends of the circumferentially intermediate part.

18. A drive plate for vehicles including a crankshaft and a torque converter, the drive plate being adapted for transmitting a turning effect of the crankshaft to the torque converter and for absorbing a positional variation in a thrust direction between the crankshaft and the torque converter, the drive plate comprising a disk-like member having:

a plurality of crankshaft fastening holes arranged in a central portion of said disk-like member in a circular array about said disk for affixing said disk to a crankshaft;

a plurality of torque converter fastening holes arranged in a radially outer portion of said disk outwardly of said crankshaft fastening holes in a circular array concentric with said crankshaft fastening holes for affixing said disk to a torque converter;

a plurality of rigidity-controlling first additional openings each positioned radially inwardly of one of said torque converter fastening holes; and at least one rigidity-controlling second additional opening positioned between circumferentially neighboring ones of said first additional openings, said second additional openings having a configuration different from a configuration of said first additional openings.

* * * * *